United States Patent
Ge et al.

(10) Patent No.: US 10,807,373 B2
(45) Date of Patent: Oct. 20, 2020

(54) FLUID EJECTION DEVICE AND PARTICLE DETECTOR

(71) Applicant: HEWLETT-PACKARD DEVELOPMENT COMPANY, L.P., Fort Collins, CO (US)

(72) Inventors: Ning Ge, Palo Alto, CA (US); Steven J Simske, Fort Collins, CO (US); Daryl E Anderson, Corvallis, OR (US); James Michael Gardner, Corvallis, OR (US); Eric Martin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/306,075

(22) PCT Filed: Sep. 23, 2016

(86) PCT No.: PCT/US2016/053271
§ 371 (c)(1),
(2) Date: Nov. 30, 2018

(87) PCT Pub. No.: WO2018/056995
PCT Pub. Date: Mar. 29, 2018

(65) Prior Publication Data
US 2019/0202206 A1  Jul. 4, 2019

(51) Int. Cl.
*B41J 2/165*  (2006.01)
*B41J 2/14*  (2006.01)
(Continued)

(52) U.S. Cl.
CPC ......... *B41J 2/16579* (2013.01); *B29C 64/209* (2017.08); *B33Y 30/00* (2014.12);
(Continued)

(58) Field of Classification Search
CPC ........ B41J 2/16579; B41J 2/2142; B41J 2/20; B41J 2/0451; B41J 2/0458; B41J 2/14072;
(Continued)

(56) References Cited

U.S. PATENT DOCUMENTS

| 779,007 A | 1/1905 | Waterston |
| 4,180,771 A * | 12/1979 | Guckel ............ A61B 5/14542 |
| | | 204/418 |

(Continued)

FOREIGN PATENT DOCUMENTS

| WO | WO-2015116072 | 8/2015 |
| WO | WO-2015116121 | 8/2015 |

(Continued)

OTHER PUBLICATIONS

Lee et al Ion-sensitive Field-Effect Transistor for Biological Sensing,: Sensors 2009, 9, pp. 7111-7131. (Year: 2009).*
(Continued)

*Primary Examiner* — Huan H Tran
(74) *Attorney, Agent, or Firm* — Dierker & Kavanuagh, P.C.

(57) ABSTRACT

In one example in accordance with the present disclosure, a fluid ejection device is described. The fluid ejection device includes a number of nozzles to eject fluid. Each nozzle includes a firing chamber to hold fluid, a nozzle orifice through which to dispense fluid, and an ejector disposed in the firing chamber to eject fluid through the nozzle orifice. The fluid ejection device also includes a particle detector to detect the presence of foreign particles within the fluid in the firing chamber.

15 Claims, 8 Drawing Sheets

(51) Int. Cl.
*B33Y 30/00* (2015.01)
*B29C 64/209* (2017.01)
*B41J 2/20* (2006.01)
*B41J 2/21* (2006.01)
*B41J 2/045* (2006.01)

(52) U.S. Cl.
CPC ........... *B41J 2/0451* (2013.01); *B41J 2/0458* (2013.01); *B41J 2/14072* (2013.01); *B41J 2/14153* (2013.01); *B41J 2/20* (2013.01); *B41J 2/2142* (2013.01); *B41J 2002/14354* (2013.01)

(58) Field of Classification Search
CPC .......... B41J 2/14153; B41J 2002/14354; B41J 2/195; B33Y 30/00; B29C 64/209; G01N 27/414
See application file for complete search history.

(56) References Cited

U.S. PATENT DOCUMENTS

| | | | |
|---|---|---|---|
| 4,322,680 A * | 3/1982 | Janata | G01N 27/414 324/71.2 |
| 4,641,084 A * | 2/1987 | Komatsu | G01N 27/414 204/406 |
| 4,791,465 A * | 12/1988 | Sakai | G01N 27/414 257/414 |
| 6,293,645 B1 | 9/2001 | Kim | |
| 7,267,418 B2 | 9/2007 | Hasebe et al. | |
| 7,637,590 B2 | 12/2009 | Jeong et al. | |
| 7,695,103 B2 | 4/2010 | Nagashima | |
| 7,717,531 B2 | 5/2010 | Paasch | |
| 8,864,289 B2 | 10/2014 | Govyadinov et al. | |
| 9,908,332 B2 * | 3/2018 | Ge | B41J 2/14153 |
| 10,099,473 B2 * | 10/2018 | Anderson | B41J 2/14153 |
| 2003/0214005 A1 * | 11/2003 | Chou | G01N 27/414 257/428 |
| 2003/0218194 A1 * | 11/2003 | Chou | G01N 27/414 257/288 |
| 2008/0024565 A1 | 1/2008 | Smith et al. | |
| 2010/0012987 A1 * | 1/2010 | Yeh | G01N 27/414 257/253 |
| 2011/0292131 A1 | 12/2011 | Wei et al. | |
| 2012/0147081 A1 | 6/2012 | Sato et al. | |
| 2013/0278656 A1 | 10/2013 | Govyadinov et al. | |
| 2014/0333694 A1 * | 11/2014 | Martin | B41J 2/14153 347/19 |
| 2014/0375710 A1 | 12/2014 | Blair et al. | |
| 2015/0009234 A1 * | 1/2015 | Johnson | G01C 21/00 345/635 |
| 2015/0276667 A1 * | 10/2015 | Klootwijk | G01N 27/4146 506/9 |
| 2015/0336385 A1 | 11/2015 | Kati et al. | |
| 2018/0009167 A1 * | 1/2018 | Alejandre | G01N 15/0612 |
| 2019/0049401 A1 * | 2/2019 | Kawarada | G01N 27/4161 |

FOREIGN PATENT DOCUMENTS

WO WO-2015177598 A1 11/2015
WO WO-2016119887 8/2016

OTHER PUBLICATIONS

J Wei et al 2010 J. Micromech. Microeng. vol. 20, No. 06 https://iopscience.iop.org/journal/0960-1317 (Year: 2010).*
Spronck et al, Characterization of a Nozzle-integrated Capacitive Sensor for Microfluidic Jet Systems, Dec. 2007, <https://www.researchgate.net/profile/Jw_Spronck/publication/224294387_Characterization_of_a_Nozzle-Integrated_Capacitive_Sensor_for_Microfluidic_Jet_Systems/links/00b495379b3a9d453e000000.pdf>.

* cited by examiner

FLUID EJECTION DEVICE AND PARTICLE DETECTOR

BACKGROUND

Fluid ejection devices such as inkjet printheads are widely used for precisely, and rapidly, dispensing small quantities of fluid. Such fluid ejection devices come in many forms. For example, fluid ejection devices may dispense fusing agent in an additive manufacturing process or may be used to dispense ink on a print medium such as paper, or other two-dimensional or three-dimensional surface.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
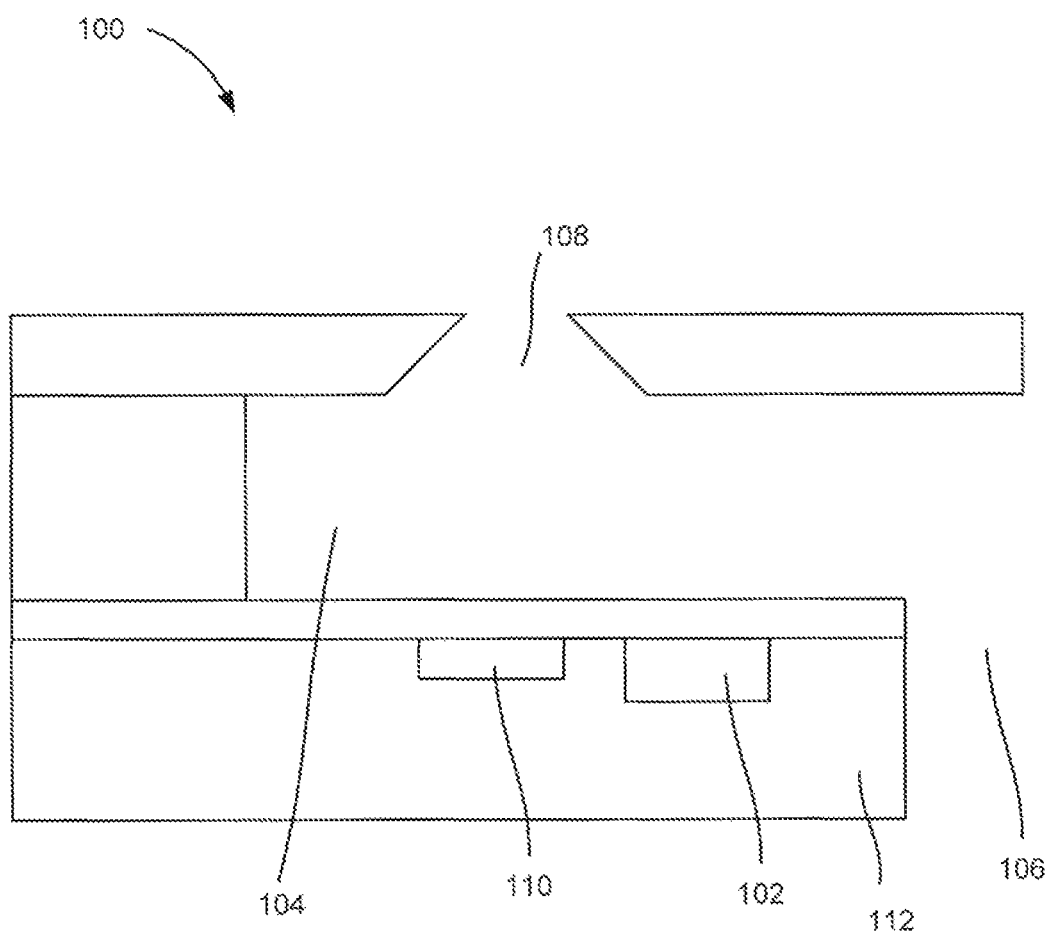
FIG. 1 is a cross-sectional diagram of a fluid ejection device with a particle detector, according to an example of the principles described herein.

Fluid ejection devices such as inkjet printheads and additive manufacturing apparatuses are widely used for precisely, and rapidly, dispensing small quantities of fluid. Such fluid ejection devices come in many forms. For example, fluid ejection devices may dispense fusing agent in an additive manufacturing process or may be used to dispense ink on a print medium such as paper. Droplets of fluid are ejected out of a nozzle orifice by creating a short pulse of high pressure within a firing chamber. An ejector in the firing chamber forces the fluid out the nozzle orifice. Examples of ejectors include thermal ejectors or piezoelectric ejectors. A thermal ejector uses a semiconductor device including a heating element (e.g., resistor) in the firing chamber along with other integrated circuitry. To eject a droplet of fluid, an electrical current is passed through the resistor. As the resistor generates heat, a small portion of the fluid within the firing chamber is vaporized. The vapor rapidly expands, forcing a small droplet out of the firing chamber through the nozzle orifice. The electrical current is then turned off and the resistor cools. The vapor bubble rapidly collapses, drawing more fluid into the firing chamber from a fluid reservoir. In these examples, the amount of heat to initialize ejection may vary depending on the volatility of the fluid to be ejected, the configuration of the firing chamber, and other such factors.

The nozzles may be arranged in columns or arrays such that property sequenced ejection of fluid from the nozzles causes characters, symbols, and/or other patterns to be formed on the surface; be the surface a layer of build material or other three-dimensional surface in an additive manufacturing apparatus or a medium such as paper in an inkjet printer. In operation, fluid flows from a reservoir to the fluid ejection device. In some examples, the fluid ejection device may be broken up into a number of dies with each die having a number of nozzles. To create the characters, symbols, and/or other pattern, a printer, additive manufacturing apparatus, or other component in which the fluid ejection device is installed sends electrical signals to the fluid ejection device via electrical bond pads on the fluid ejection device. The fluid ejection device then ejects a small droplet of fluid from the reservoir onto the surface. These droplets combine to form an image or other pattern on the surface.

The fluid ejection device includes a number of components for depositing a fluid onto a surface. For example, the fluid ejection device includes a number of nozzles. A nozzle includes an ejector, a firing chamber, and a nozzle orifice. The nozzle orifice allows fluid, such as ink or a fusing agent, to be deposited onto a surface, such as a powder build material or a print medium. The firing chamber includes a small amount of fluid. The ejector is a mechanism for ejecting fluid through the nozzle orifice from a firing chamber. The ejector may include a firing resistor or other thermal device, a piezoelectric element, or other mechanism for ejecting fluid from the firing chamber.

For example, the ejector may be a firing resistor. The firing resistor heats up in response to an applied voltage. As the firing resistor heats up, a portion of the fluid in the firing chamber vaporizes to form a bubble. This bubble pushes fluid out the nozzle orifice and onto the surface. As the vaporized fluid bubble pops, a vacuum pressure within the firing chamber draws fluid into the firing chamber from the fluid supply, and the process repeats. This system is referred to as a thermal inkjet system. In some examples, the system may be a volatility-enhanced thermal inkjet system where the expulsion momentum of the fluid is enhanced by the volatility of the nucleated fluid.

In another example, the ejector may be a piezoelectric device. As a voltage is applied, the piezoelectric device changes shape which generates a pressure pulse in the firing chamber that pushes a fluid out the nozzle orifice and onto the surface.

While such fluid ejection devices undoubtedly have advanced the field of precise fluid delivery, some conditions impact their effectiveness. For example, in some scenarios, foreign particles may enter the firing chamber. Some of these foreign particles may be of sufficient size, be present in sufficient quantities, or have other attributes that negatively affect the operation of the fluid ejection device. As a specific example, during additive manufacturing, a powder build material is deposited in a build area. A fusing agent is then disposed on portions of the powder build material that are to be fused to form a layer of a three-dimensional object. The fusing agent increases the energy absorption of the underlying build material. Accordingly, as energy is applied to a surface of the build material, the build material that has received the fusing agent, and therefore has increased energy absorption characteristics, hardens while that portion of the build material that has not received the fusing agent remains in powder form. This process is repeated in a layer-wise fashion to generate a three-dimensional object.

In such an additive manufacturing apparatus, particulate matter from a powder based building volume could enter the firing chamber of the nozzle that dispenses the fusing agent. In this case, the particulate matter could clog the nozzle orifice leading to irregular fluid deposition, or may inhibit fluid deposition altogether.

Accordingly, the present specification describes devices and methods for detecting the foreign particulate matter. Specifically, the presence and attributes of the foreign particulate matter are detected, and if deemed appropriate, remedial measures such as increasing a drop rate, pausing deposition, performing multi-pass deposition, or notifying a user of the blockage, may be carried out so as to alleviate the condition generated by the presence of the foreign particulate matter. While specific reference is made to particulate matter in an additive manufacturing apparatus, such foreign particles may be present in other systems such as an inkjet printhead.

Specifically, the present specification describes a particle detector that is in the fluid ejection device. Specifically, the particle detector may be in the firing chamber, in a fluid slot leading to the firing chamber, or other space within the fluid ejection device. This particle detector, using a number of methods, can determine whether undesirable foreign particles are found in the fluid ejection device, which undesirable foreign particles could degrade deposition quality or otherwise negatively impact deposition. Based on the detected information, appropriate remedial actions may be carried out.

Specifically, the present specification describes a fluid ejection device. The fluid ejection device includes a number of nozzles to eject an amount of fluid. Each nozzle includes a firing chamber to hold the amount of fluid, a nozzle orifice to dispense the amount of fluid, and an ejector disposed in the firing chamber to eject the amount of fluid through the nozzle orifice. The fluid ejection device also includes a particle detector to detect the presence of foreign particles within the amount of fluid.

The present specification also describes an additive manufacturing apparatus. The apparatus includes a build material distributor to successively deposit layers of a build material in a build area. An agent distributor of the additive manufacturing apparatus includes at least one fluid ejection device to distribute a fusing agent onto the layers of build material to increase the energy absorption of portions of the build material that receive the fusing agent. The additive manufacturing device also includes a particle detector to detect the presence of build material particles.

The present specification also describes a method for determining particle presence in a fluid. According to the method, a concentration of ions in a solution within a firing chamber of a fluid ejection device is determined. The solution includes the fluid and foreign particles. It is then determined whether the concentration of ions within the solution is outside a range of expected concentration of ions for the fluid itself, without the foreign particles. Based on the concentration of ions within the solution, the presence of foreign particles in the fluid is determined.

In one example, using such a particle detector in the fluid ejection device 1) provides on-chip particle detection capabilities; 2) allows for more advanced detection of particles; 3) provides a low cost solution as compared to off-ship detection; and 4) can be implemented in inkjet printing as well as additive manufacturing operations. However, it is contemplated that the devices disclosed herein may address other matters and deficiencies in a number of technical areas.

As used in the present specification and in the appended claims, the term "nozzle" refers to an individual component of a fluid ejection device that dispenses fluid onto a surface. The nozzle includes at least a firing chamber, an ejector, and a nozzle orifice.

As used in the present specification and in the appended claims, the term "a number of" or similar language is meant to be understood broadly as any positive number including 1 to infinity.

FIG. 1 is a cross-sectional diagram of a fluid ejection device (100) with a particle detector (102), according to an example of the principles described herein. The fluid ejection device (100) includes a number of nozzles to eject an amount of fluid. Each nozzle includes a firing chamber (104) to hold the amount of fluid. Fluid may pass into the firing chamber (104) via a fluid slot (106) that fluidically connects the nozzle to a fluid supply such as an ink reservoir or a fluid agent reservoir. It is through a nozzle orifice (108) that the fluid is actually dispensed. An ejector (110) that is disposed within the firing chamber (104) works to eject the amount of fluid through the nozzle orifice (108). As can be seen in FIG. 1, the ejector (110) may be disposed in a substrate (112) and disposed underneath a passivation layer that protects the ejector (110) and other components from mechanical damage and corrosion. While FIG. 1 depicts a nozzle, other types of ejection mechanisms may be implemented as well including duckbill valves and pressure valves.

Returning to the ejector (110), the ejector (110) may be of varying types. For example, the ejector (110) may be a firing resistor. The firing resistor heats up in response to an applied voltage. As the firing resistor heats up, a portion of the fluid in the firing chamber (104) vaporizes to form a bubble. This bubble pushes liquid fluid out the nozzle orifice (108) and onto the surface. As the vaporized fluid bubble pops, a vacuum pressure within the firing chamber (104) draws fluid into the firing chamber (104) from the fluid supply, and the process repeats. This system is referred to as a thermal inkjet system. In some examples, the system may be a volatility-enhanced thermal inkjet system where the expulsion momentum of the fluid is enhanced by the volatility of the nucleated fluid.

In another example, the ejector (110) may be a piezoelectric device. As a voltage is applied, the piezoelectric device changes shape which generates a pressure pulse in the firing chamber (104) that pushes a fluid out the nozzle orifice (108) and onto the surface.

In some examples, the nozzle orifice (108), the firing chamber (104), and/or the fluid slot (106) can become blocked or clogged. For example, in a printing operation, particulate matter such as dust, debris or other environmental components can enter the nozzle orifice (108) and clog the nozzle. In an additive manufacturing example, powder build material that is deposited can similarly clog the nozzle in any number of ways. In some cases, the amount—or size—of the particles may not be sufficient to justify remedial action. However, in other cases, the particle size and/or quantity may justify a remedial action. Accordingly, the fluid ejection device (100) includes a particle detector (102) that detects the presence, and attributes, of foreign particles within the fluid disposed in the fluid ejection device (100).

In one example, a controller can drive the particle detector (102) to measure ion concentration. The controller obtains samples of electrical output from the particle detector (102). The output is representative of ion concentration. In this example, the controller provides the samples to a computing device. The computing device can include a fluid analyzer. The fluid analyzer can analyze the electrical samples and can derive fluid properties therefrom. In some examples, the functionality of the fluid analyzer can be implemented in the controller rather than the computing device. Based on the results of the fluid analyzer, a decision may be made to execute or not execute any of a number of remedial operations.

Returning to the particle detector (102), such a detector (102) may take many forms. For example, the particle detector (102) may be a capacitive detector. In other words, a first portion of the particle detector (102) and a second part of the particle detector (102) may form capacitive plates with a solution of the fluid and any intermixed particles disposed therein. In other words, the solution between the capacitive plates completes the circuit. The measured capacitance between the two portions can be compared to a predetermined capacitance of the fluid and it can be determined whether there are foreign particles in the fluid, and whether the impact on the foreign particles is sufficient enough to justify remedial action. In some examples, the capacitive sensors are resonant coaxial radio frequency cavities coupled to a pair of electrodes. In some cases, the chamber can be formed to enhance the detection of particular types of particulates/cells.

In another example, the particle detector (102) may be an impedance detector. In this example, electrical sine waves are swept across the two portions of the particle detector (102) which portions are in contact with the solution in the firing chamber (104). The circuit is complete from one portion to the other through the solution. The response of the resulting signal can be digitized and evaluated for amplitudes at various frequencies, for example from 1 kilohertz (kHz) to 1 megahertz (MHz). In some examples, the resulting signal can be analyzed in the analog domain. These results can be compared to predetermined electrical impedance spectrum signals for the fluid. The predetermined electrical impedance spectrum signals serve as a fingerprint for the fluid. Based on this comparison, it can be determined whether there are foreign particles in the fluid, and whether the impact on the foreign particles is sufficient enough to justify remedial action. In this example, the particle detector (102) includes a pair of electrodes that are in contact with a solution in the firing chamber (104), which solution includes the amount of fluid to be ejected and any intermixed foreign particles. The electrodes determine an impedance profile of the solution, i.e., the fluid with particles. This impedance profile of the solution can then be compared against an impedance profile of the fluid without particles to determine the presence, and attributes of any foreign particles.

While specific reference has been made to particular modes of operation of the particle detector (102), various types of particle detectors (102) could be used including particle detectors (102) using visible light, particle detectors (102) using non-visible light, and particle detectors (102) that measure a viscosity of the fluid, among others.

Moreover, as depicted in FIG. 1, in some examples, the particle detector (102) is disposed within the firing chamber (104). However, in other examples the particle detector (102) may be disposed at other locations within the fluid ejection device (100). For example, the particle detector (102) may be disposed within the fluid slot (106).

Including a particle detector (102) in the fluid ejection device (100) may extend the life of the fluid ejection device (100) and enhance its performance. For example, as described above, due to any number of mechanisms, particulate matter may enter the fluid ejection device (100) and may impede the precise and accurate ejection of fluid. In some cases, blocking the nozzle orifice (108) entirely. Accordingly, a particle detector (102) that acquires information relating to the presence and attributes of foreign particles can allow for remedial actions such as user notification, multi-pass deposition, or increased rate of deposition to be performed to account for the presence of the foreign particles.

Moreover, such particulate matter could affect the operating life of the fluid ejection device (100). Specifically, the ingress of certain types or amounts of particulate matter may impact the flow of fluid into and out of the firing chamber (104). If a reduced flow is generated, then the fluid may not cover the ejector (110) for a period of time. As the fluid covering the ejector (110) dissipates heat generated by the ejector to create the vapor bubble, if fluid is prevented from contacting, and thereby cooling, the ejector (110), the ejector (110) may overheat, and degrade in operation more quickly.

Figure 2:
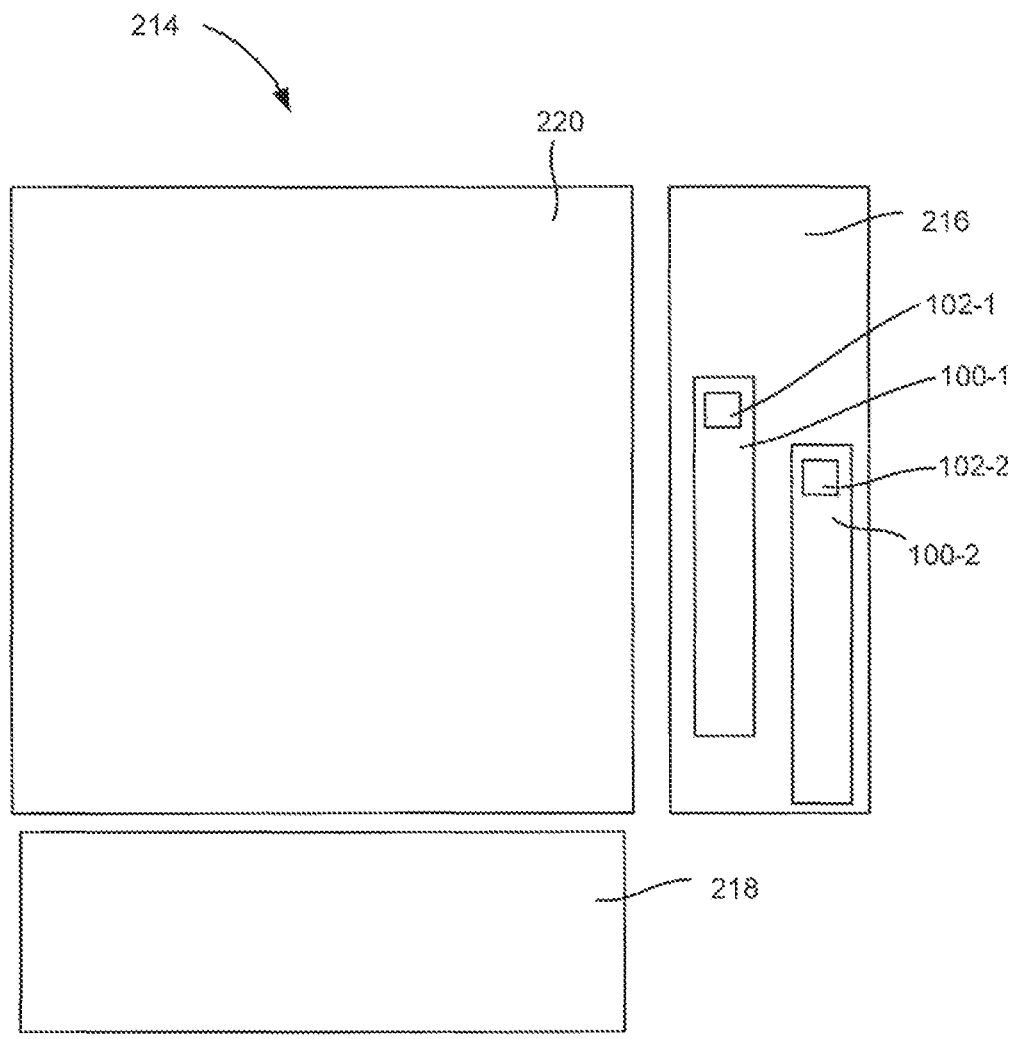
FIG. 2 is a simplified top diagram of an additive manufacturing apparatus with a particle detector, according to an example of the principles described herein.

FIG. 2 is a simplified top view of an additive manufacturing apparatus (214) with a particle detector (102), according to an example of the principles described herein. In general, apparatuses for generating three-dimensional objects may be referred to as additive manufacturing apparatuses (214). The apparatus (214) described herein may correspond to three-dimensional printing systems, which may also be referred to as three-dimensional printers. In an example additive manufacturing process, a layer of build material may be formed in a build area (220), a fusing agent may be selectively distributed on the layer of build material, and energy may be temporarily applied to the layer of build material. The energy creates a reaction between the fusing agents and the build material, which leads to the components to selectively fuse together. This process is then repeated until a complete physical object has been formed. Accordingly, as used herein, a build layer may refer to a layer of build material formed in a build area (220) upon which the fusing agent may be distributed and/or energy may be applied.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where the powder-based build material may include wet and/or dry powder-based materials, particulate materials, and/or granular materials. In some examples, the build material may be a weak light absorbing polymer. In some examples, the build material may be a thermoplastic. Furthermore, as described herein, the fusing agent may include fluids that may facilitate fusing of build material when energy is applied. The fusing agent may be a light absorbing liquid, an infrared or near infrared absorbing liquid, such as a pigment colorant.

The additive manufacturing apparatus (214) includes at least one agent distributor (216). An agent distributor (216) includes at least one fluid ejection device (100-1, 100-2) to distribute a fusing agent onto the layers of build material. As used in the present specification the indicator "-" represents a second instance of a component.

Returning to the additive manufacturing apparatus (214), as described above, the fusing agent increases the energy absorption of portions of the build material that receive the fusing agent. A fluid ejection device (100) may include at least one printhead (e.g., a thermal ejection based printhead, a piezoelectric ejection based printhead, etc.). In some examples, the agent distributor (216) is coupled to a scanning carriage, and the scanning carriage moves along a scanning axis over the build area (220). In one example, printheads that are used in inkjet printing devices may be used as an agent distributor (216). In this example, the fusing agent may be ink. In other examples, an agent distributor (216) may include other types of fluid ejection devices (100) that selectively eject small volumes of fluid.

The agent distributor (216) includes at least one fluid ejection device (100) that has a plurality of fluid ejection dies arranged generally end-to-end along a width of the agent distributor (216). The at least one fluid ejection device (100) may include a plurality of printheads arranged generally end-to-end along a width of the agent distributor (216). In such examples, the width of the agent distributor (216) corresponds to a dimension of the build area (220). For example, a width of the agent distributor (216) may correspond to a width of the build area (220). The agent distributor (216) selectively distributes an agent on a build layer in the build area (220) concurrent with movement of the scanning carriage over the build area (220). In some example apparatuses, the agent distributor (216) includes nozzles, including nozzle orifices (FIG. 1, 108), through which the fusing agent is selectively ejected. In such examples, the agent distributor (216) includes a nozzle surface in which a plurality of nozzle orifices are formed.

The additive manufacturing apparatus (214) also includes a build material distributor (218) to successively deposit layers of the build material in the build area (220). The build material distributor (218) may include a wiper blade, a roller, and/or a spray mechanism. Similar to the agent distributor (216), the build material distributor (218) may be coupled to a scanning carriage. In operation, the build material distributor (218) forms build material in the build area (220) as the scanning carriage moves over the build area (220) along the scanning axis to form a build layer of build material in the build area (220).

The additive manufacturing apparatus (214) also includes particle detectors (102-1, 102-2) in the fluid ejection devices (100) to detect the presence of build material particles in the fluid ejection devices (100). Specifically, a first particle detector (102-1) is disposed in a first fluid ejection device (100-1) and a second particle detector (102-2) is disposed in a second fluid ejection device (100-2).

As described above, build material particles may enter the fluid ejection devices (100) as the fluid ejection devices (100) pass over the build area (220). There may be many mechanisms that facilitate the ingress of build material particles into the fluid ejection devices (100). For example, the force of impact of fluid droplets from the fluid ejection device (100) may dislodge particulate matter in the build area (220) which may drift through the nozzle orifices (FIG. 1, 108) into the firing chamber (FIG. 1, 104) and/or the fluid slot (FIG. 1, 106). An electrostatic pull from components on the fluid ejection device (100) may further draw the particulate matter up into the fluid ejection device (100).

The particle detectors (102-1, 102-2) of the fluid ejection devices (100-1, 100-2) detect the presence, and attributes of the particles to determine if subsequent remedial actions are prudent to continue to generate precise and accurate fluid drops. For example, some particulate matter in the fluid ejection device (100) may not be of a type, or in a position, where fluid ejection is affected, in these cases no remedial action may be performed at a particular point in time. However, later, an increased amount of particulate entry may affect nozzle performance such that some remedial action is desirable.

Figure 3A:
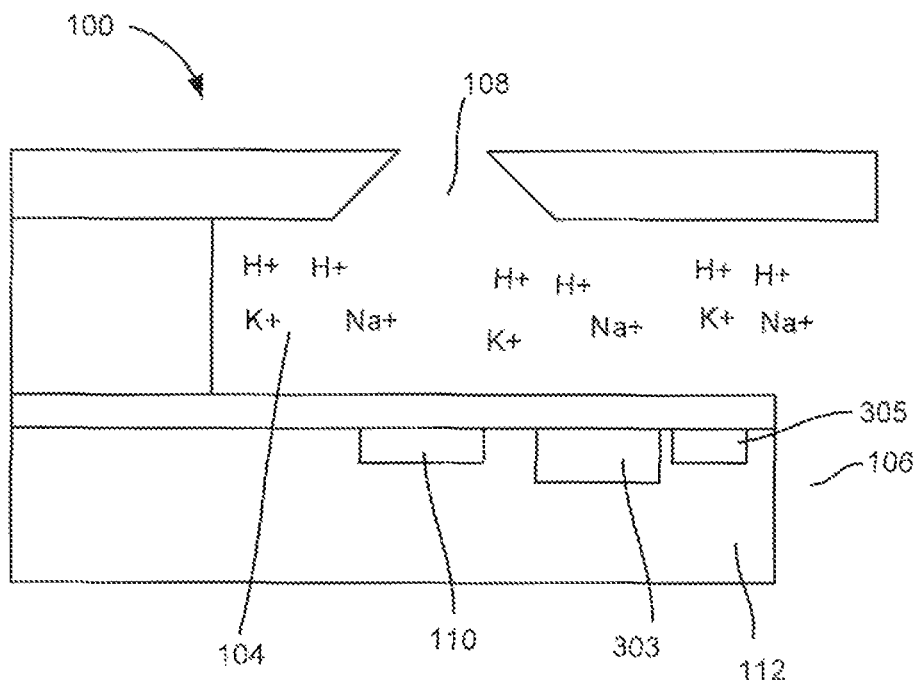
FIGS. 3A and 3B are cross-sectional diagrams of a fluid ejection device with a particle detector, according to an example of the principles described herein.
Figure 3B:
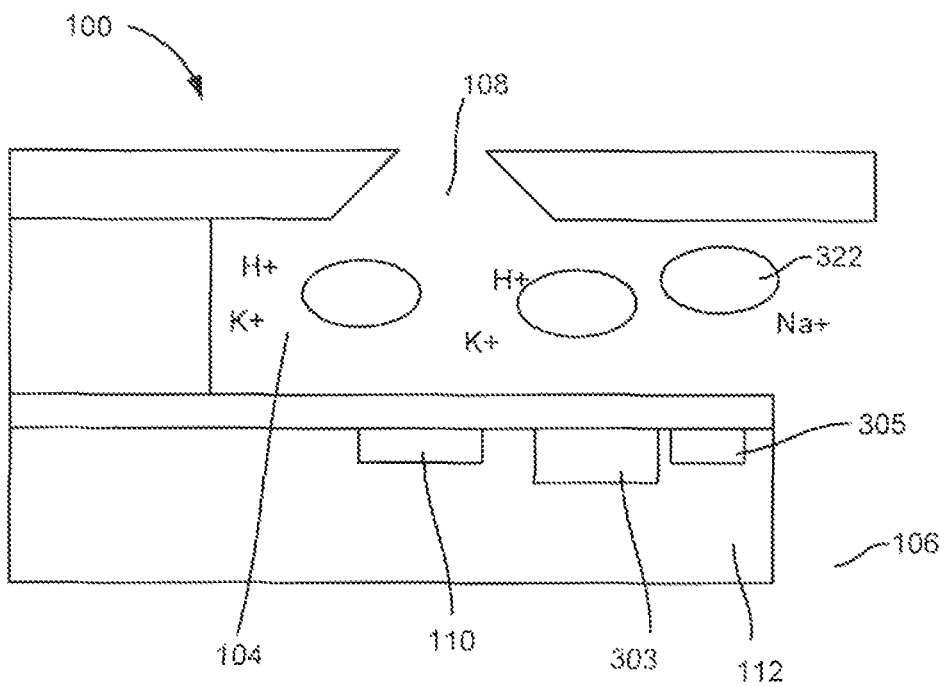

FIGS. 3A and 3B are cross-sectional diagrams of a fluid ejection device (100) with a particle detector (FIG. 1, 102), according to an example of the principles described herein. Specifically, FIG. 3A is a cross-sectional diagram of the fluid ejection device (100) with no foreign particles in the firing chamber (104) and FIG. 3B is a cross-sectional diagram of the fluid ejection device (100) with foreign particles (322) present in the firing chamber (104). As will be described in FIGS. 3A-4, variations detected within the fluid ejection device (100) may be used to determine the presence of foreign particles in an amount of fluid. For example, FIGS. 3A and 3B describe detection of foreign particles via measuring and determining a change in ion concentration and FIG. 4 describes the detection of foreign particles by measuring and determining a change in impedance of the fluid.

As depicted in FIG. 3A, during operation, the fluid may have a certain amount of ions. In FIG. 3A these ions are indicated as hydrogen ions, potassium ions, and sodium ions, however other ions may be present in the fluid and may be used to determine foreign particle presence. In some cases, the fluid may be altered to increase the amount of these ions to more readily allow detection of foreign particles. The ion concentration for a given fluid may be identified beforehand, and deviations from this identified concentration can indicate the presence of foreign particles, which deviation may be determined to necessitate remedial action.

FIG. 3B depicts the effect of foreign particles (322) on the concentration of ions within the firing chamber (104). In this example, the particle detector FIG. 1, 102) may be an ion-sensitive field-effect transistor (303) coupled to an electrode (305) via the solution. However, as noted above and as described below, other types of particles detectors (FIG. 1, 102) may be implemented.

In FIG. 3B, for simplicity one instance of a foreign particle (322) is indicated with a reference number. As can be seen in FIG. 3B, the foreign particles (322) in the firing chamber (104) displace an amount of the fluid, thereby reducing the amount of ions in the solution containing the fluid and the foreign particles (322). The particle detector (FIG. 1, 102) which may include a transistor (303) and an electrode (305) disposed on a same surface of the firing chamber (104) can be used to determine the ion concentration, and then determine if the ion concentration of the solution is a threshold amount different than an expected ion concentration of just the fluid, without the foreign particles (322) present. While description has been made of detecting a drop in ion concentration being the result of the presence of foreign particles (322), in some examples, the presence of a foreign particle (322) could result in increased ion concentration, which could also be detected by the particle detector (FIG. 1, 102) to determine foreign particle (322) presence.

In summary, in FIG. 3A, a particle detector (FIG. 1, 102), i.e., the transistor (303) and electrode (305) pair, would determine a quantity of ions that is expected for the given fluid, and in FIG. 3B, when foreign particles (322) are present, the localized ion levels and solution dielectric changes. Accordingly, the particle detector (FIG. 1, 102) can detect the loss of full ions and variations due to the foreign particles (322). Moreover, back calculations could be performed to determine a quantity and position of such foreign particles (322) within the firing chamber (104). As described above, knowing the quantity and position of the foreign particles (322) allows for a more informed decision be made regarding whether remedial action is desirable.

Figure 4:
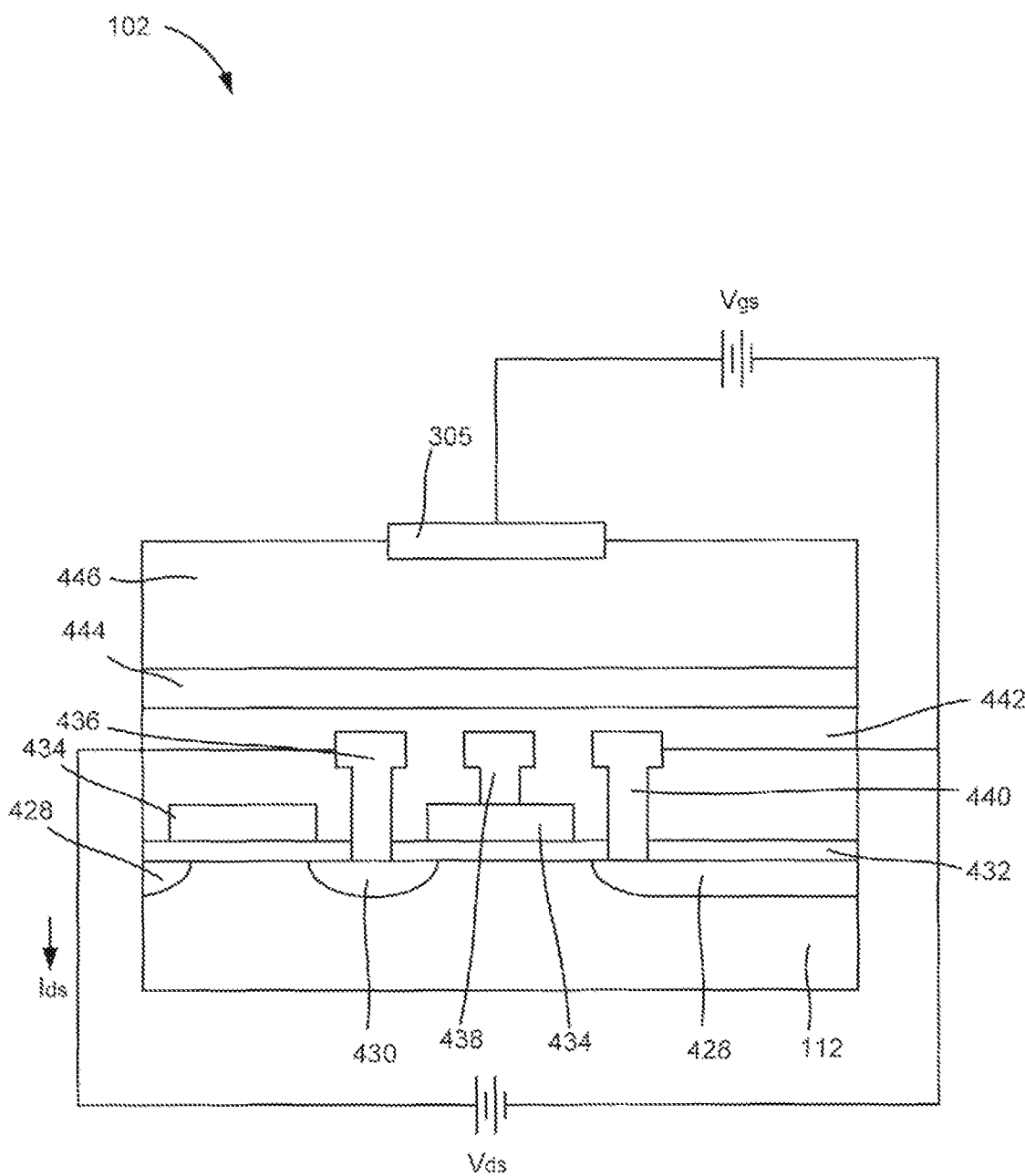
FIG. 4 is a cross-sectional diagram of an ion-sensitive field-effect transistor particle detector, according to examples of the principles described herein.

FIG. 4 is a cross-sectional diagram of an ion-sensitive field-effect transistor particle detector (102), according to examples of the principles described herein. In some examples, the particle detector (102) includes an ion-sensitive field-effect transistor (ISFET) (FIG. 3, 303) that is capacitively coupled to an electrode (305) through a passivation layer (444). An ISFET (FIG. 3, 303) is a type of field-effect transistor that is used to measure ion concentrations in solution. When the ion concentration within the solution changes, the current through the ISFET (FIG. 3, 303) will change accordingly. In the example depicted in FIG. 4, the solution (446) is used as the gate electrode for the ISFET (FIG. 3, 303).

The ISFET (FIG. 3, 303) can be designed to be responsive to particular ion concentrations. As the concentrations change over time, the changes can be detected as shifts in the threshold voltage of the ISFET (FIG. 3, 303).

In general, the ISFET (FIG. 3, 303) is formed on, or integrated in the substrate (112) that may be formed of silicon that has diffusion regions that will form the source (428) and drain (430) of the ISFET (FIG. 3, 303). In one example, the ISFET (FIG. 3, 303) uses N-type metal-oxide semiconductor (NMOS) logic such that the substrate (112) is a P-type substrate and the diffusion regions are N+ doped regions. For purposes of clarity, NMOS logic is indicated in FIG. 4; however, ISFET (FIG. 3, 303) may be implemented using P-type metal-oxide semiconductor (PMOS) logic or complementary metal oxide semiconductor (CMOS) logic. In the case of PMOS logic, the substrate (112) is N-type silicon and the diffusion regions that make up the source (428) and drain (430) are P+ doped regions. The configuration for N-wells in N-well CMOS logic are similar to the PMOS configuration, and the configuration for P-wells in P-well CMOS logic are similar to the NMOS configuration.

In this example, the ISFET (FIG. 3, 303) includes a gate oxide layer (432) formed on the substrate (112). The gate oxide layer (432) may include a dielectric oxide material, such as silicon dioxide ($SiO_2$), a high-k dielectric material, such as hafnium oxide ($HfO_2$) or aluminum oxide ($Al_2O_3$), or the like. A polysilicon layer is formed and patterned over the gate oxide layer (432) resulting in the formation of the polysilicon region (434) between the source (428) and the drain (430). A first metal layer (M1) is formed and patterned over the polysilicon layer (434) resulting in formation of M1 regions (436, 438, 440) that are in electrical contact with the source (428) and drain (430) and the polysilicon region (434). Note that while FIG. 4 depicts just an M1 layer, in some examples, a second metal layer (M2) is formed and patterned over M1 resulting in formation of an M2 region that is in electrical contact with the second M1 region (438).

A dielectric layer (442) isolates the first, second and third M1 layers (436, 438, 440) and the polysilicon layer (434) from each other with exception of the specific electrical contacts described above. The dielectric layer (442) may include silicon dioxide. A passivation layer (444) is formed on the dielectric layer (442). The passivation layer (444) may include different material including strontium oxide, silicon nitride, silicon carbide, and hafnium oxide.

Together, the polysilicon layer (434) and the second M1 layer (438) in electrical contact therewith form an "extended gate" of a metal-oxide field-effect transistor (MOSFET) having the source (428) and the drain (430) (assuming NMOS). Together with the passivation layer (444), the MOSFET is an ion-sensitive FET or "ISFET." For purposes of clarity by example, one metal layer, M1 is shown. However, it is to be understood that the ISFET (FIG. 3, 303) may be formed using more than 1 metal layer. The metal layer(s) can be formed of any metal or metal alloy (e.g., Titanium (Ti), Tantalum (Ta), Aluminum (Al), Titanium nitride (TiN), Aluminum copper (AlCu), Tantalum aluminum (TaAl), etc.).

In operation, the passivation layer (444) contacts the solution (446). The electrode (305) is also disposed to be in electrical contact with the solution (446) and is capacitively coupled with the extended gate of the ISFET (FIG. 3, 303), e.g., the portion of the second metal layer (438) forming the extended gate through the solution (446), the passivation layer (444) and the dielectric layer (442). The electrode (305) may be formed of any metal or metal alloy.

As depicted in FIG. 4, the source (428) is coupled to a reference voltage (e.g., electrical ground) and a voltage is applied to the electrode (305). The electrode (305) acts as the reference gate of the ISFET (FIG. 3, 303). The voltage between the electrode (305) and the source (428) is the gate-to-source voltage, referred to as $V_{gs}$. The charge distribution for the ISFET (FIG. 3, 303) will change according to an ion concentration change. In other words, the solution (446) including the fluid and the foreign particles (FIG. 3, 322) acts as a gate electrode that affects the threshold voltage of the ISFET (FIG. 3, 303). As the charge distribution changes, the threshold voltage of the ISFET (FIG. 3, 303) changes. For example, the ISFET (FIG. 3, 303) threshold voltage depends on the ion concentration of a solution (446) in contact with the passivation layer (444). Changes in the threshold voltage of the ISFET (FIG. 3, 303) can be measured by measuring change in drain-to-source current, $I_{ds}$, for a particular drain-to-source voltage, $V_{ds}$. In general, materials for the electrode (305) and the passivation layer (444) can be selected such that the threshold voltage of the ISFET (FIG. 3, 303) changes over time in response to changes in a particular ion concentration. Changes in the threshold voltage are detected through measurements of drain-to-source current given a particular drain-to-source voltage. While FIG. 4 depicts the electrode (305) on an opposite surface of the solution (446) from the ISFET (FIG. 3, 303), i.e., the poly gate (434), second metal layer (438), dielectric layer (442), and passivation layer (444); the electrode (305) may be on a same surface, i.e., the substrate (112) of the particle detector (FIG. 1, 102). The substrate (112) may be an interior wall of the firing chamber (FIG. 1, 104) or the fluid slot (FIG. 1, 106).

In some examples, a particular type of ISFET (FIG. 3, 303) or multiple ISFETs (FIG. 3, 303) may be used to detect a particular foreign particle. For example, some foreign particles may be difficult to detect in general, may be difficult to detect with certain ISFETS (FIG. 3, 303), or may have difficulty distinguishing between harmless foreign particles and harmful foreign particles. Accordingly, multiple ISFETs (FIG. 3, 303) could be used to detect and distinguish these foreign particles. Still further, an ISFET (FIG. 3, 303) may be formed to specifically detect a particular foreign particle.

Figure 5:
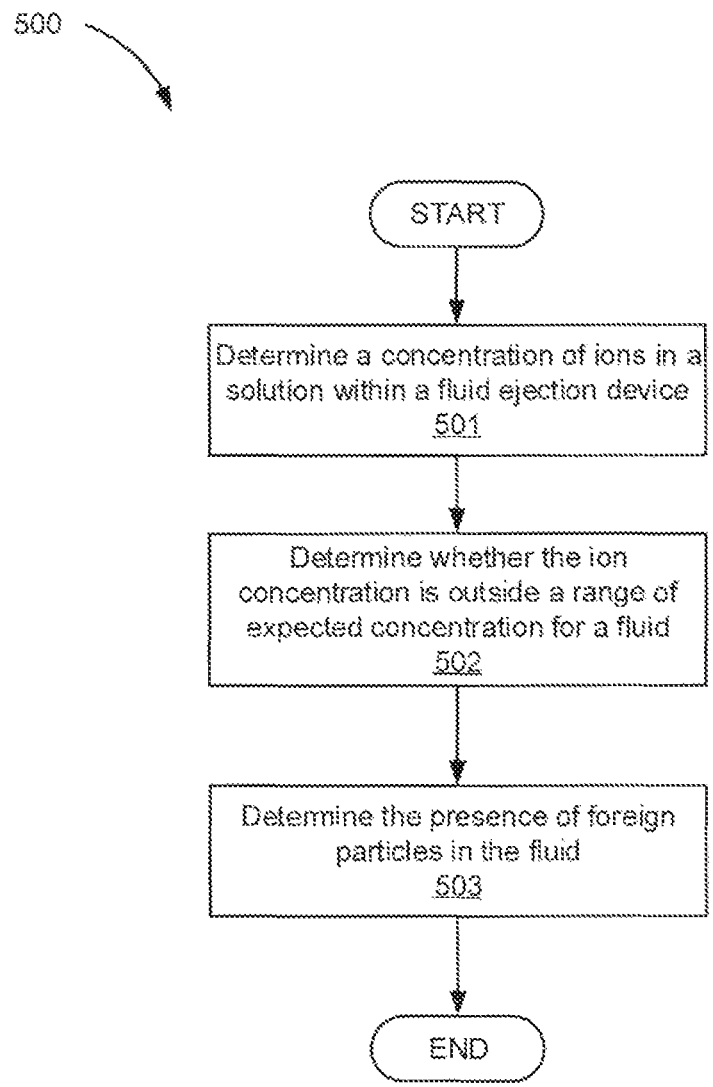
FIG. 5 is a flowchart of a method for detecting foreign particles in a fluid ejection device, according to an example of the principles described herein.

FIG. 5 is a flowchart of a method (500) for detecting foreign particles (FIG. 3, 322) in a fluid ejection device (FIG. 1, 100), according to an example of the principles described herein. As described above, a fluid ejection device (FIG. 1, 100) includes a fluid that may include foreign particles (FIG. 3, 322) at any point in time. To determine the presence of foreign particles (FIG. 3, 322) in the fluid, the concentration of ions within a solution (FIG. 4, 446) that includes the fluid and any associated foreign particles (FIG. 3, 322) is determined (block 501). That is, the ion concentration of the contents of a fluid ejection device (FIG. 1, 100), either in the firing chamber (FIG. 1, 104) or the fluid slot (FIG. 1, 106), is determined. The contents of the fluid ejection device (FIG. 1, 100) could include the fluid and any intermixed foreign particles (FIG. 3, 322).

Determining the ion concentration of the contents of a fluid ejection device (FIG. 1,100) may include coupling a voltage to the electrode (FIG. 3, 305) that is 1) in contact with the solution (FIG. 4, 446) and 2) is capacitively coupled to a gate of the ISFET (FIG. 3, 303). Such a coupling of the voltage results in a drain-to-source voltage for the ISFET (FIG. 3,303). A corresponding drain-to-source current for the given drain-to-source voltage can then be measured. A plurality of drain-to-source current measurements can be obtained overtime and ion concentration measurements derived from changes in the drain-to-source current over time for the given drain-to-source voltage.

In another example, determining (block 501) a concentration of ions in a solution (FIG. 4, 446) within a fluid ejection device (FIG. 1, 100) may include examining a drive bubble within the firing chamber (FIG. 1, 104). For example, as described above, a bubble is formed via operation of the ejector (FIG. 1, 110) to force fluid out the nozzle orifice (FIG. 1, 108). As a result of the fluid supply back pressure, after the nozzle fires, the bubble collapse and the firing chamber (FIG. 1, 104) is re-filled with fluid. Capacitive sensors in the firing chamber (FIG. 1, 104) can detect the presence/absence of the bubble based on the different resistive characteristics of air and fluid. The timing of the bubble refill is affected by fluid drop qualities, i.e., volume, velocity, and clearness of the nozzle orifice (FIG. 1, 108). Accordingly, by measuring the timing and profile of the drive bubble over the course of its life, a controller could determine the nozzle health.

Next, it is determined (block 502) whether the ion concentration of the solution (FIG. 4, 446) is outside of a range from an expected ion concentration for the desired fluid. For example, a computing device may include a database that indicates the expected ion concentration ranges for the fluid that is intended to be ejected from the fluid ejection device (FIG. 1, 100). Such a fluid may be ink, or a fusing agent. In some examples, the ink and/or fusing agent may be modified so as to make easier the detection of ion concentrations. The information gathered from the particle detector (FIG. 1, 102) regarding the concentration of ions of the solution (FIG. 4, 446) inside of the fluid ejection device (FIG. 1, 100) is then compared against this anticipated ion concentration for the fluid. If the difference between the two is greater than a threshold amount, it may be determined (block 503) that foreign particles (FIG. 3, 322) are present in the solution, thereby altering the ion concentration of the solution.

In some examples, in addition to determining (block 503) the presence of foreign particles (FIG. 3, 322), attributes of the foreign particles (FIG. 3, 322) may also be determined. Examples of such attributes include chemical makeup, volume, quantity, and location. This additional information allows for a better-tailored remedial operation to be carried out. For example, some foreign particles (FIG. 3, 322) may be small enough, few enough in quantity, or in too few of locations, that they do not effect print quality. In this example, remedial measures may not yet be desirable.

However, under other circumstances, or over time, other foreign particles (FIG. 3, 322), or more foreign particles (FIG. 3, 322), may in fact have an impact on fluidic ejection. In these cases, remedial measures may be executed to account for such a presence. Examples of remedial measures include notifying a user via a user interface, inducing multi-pass printing to offset the effects of a blocked nozzle, performing fluid ejection device (FIG. 1, 100) cleaning operations, and/or increasing fluidic ejection rates.

Figure 6:
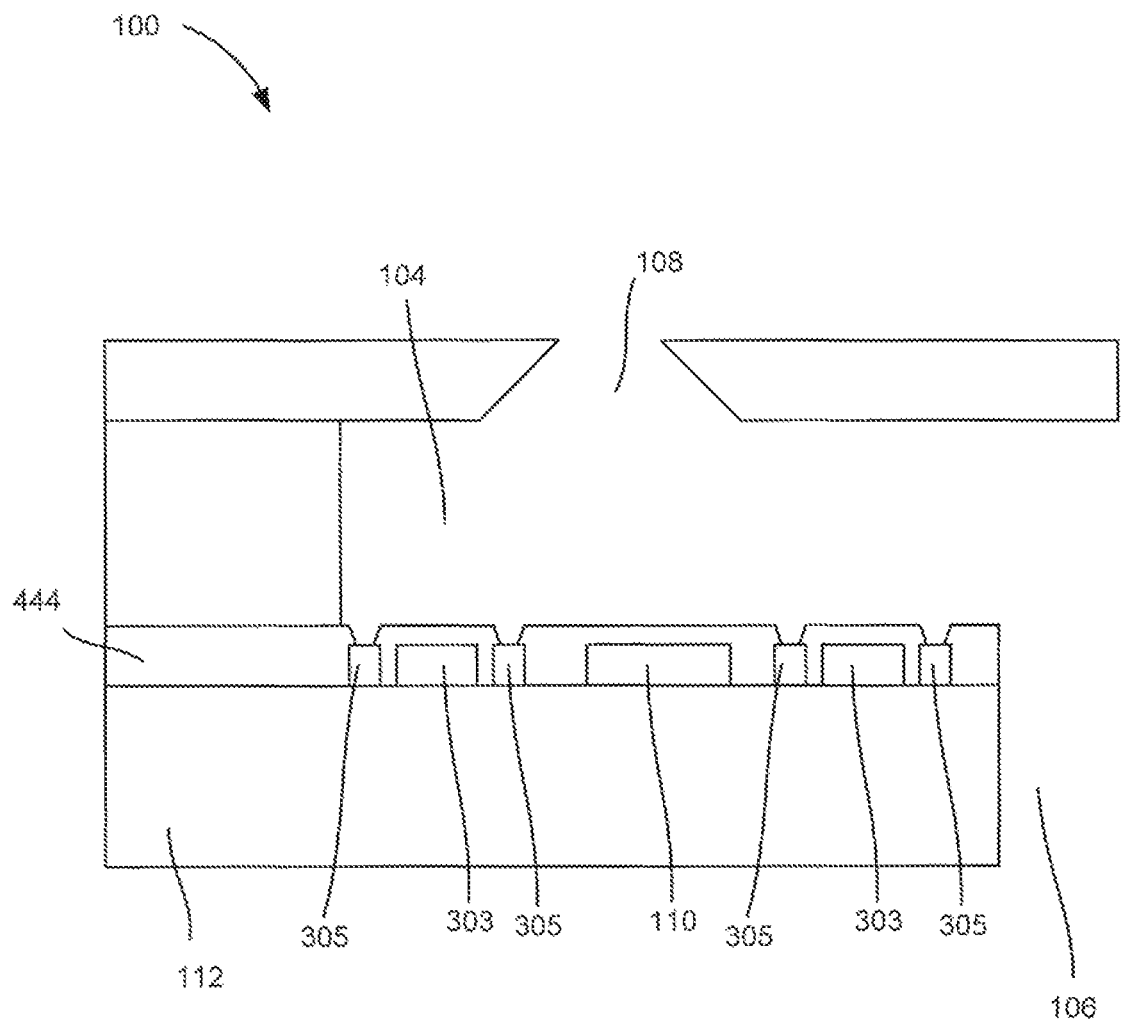
FIG. 6 is a cross-sectional diagram of a fluid ejection device with a particle detector, according to another example of the principles described herein.

FIG. 6 is a cross-sectional diagram of a fluid ejection device (100) with a particle detector (FIG. 1, 102), according to another example of the principles described herein. Specifically, the particle detector (FIG. 1, 102) depicted in FIG. 6 includes an ISFET (303) that is capacitively coupled through the solution (FIG. 4, 446) to electrodes (305). As depicted in FIG. 6, the ISFET (303) and the ejector (110) are disposed on a same surface of the firing chamber (104) and the ISFET (303) and the electrode (305) are disposed on a same surface of the firing chamber (104).

Figure 7:
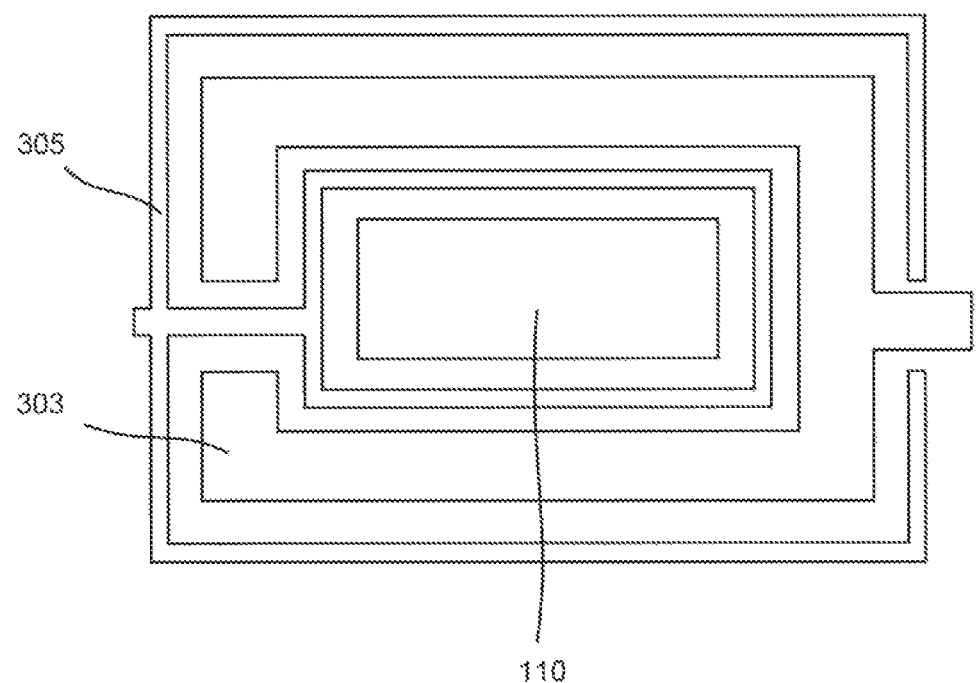
FIG. 7 is a top view of the fluid ejection device with a particle detector depicted in FIG. 6, according to an example of the principles described herein.

FIG. 7 is a top view of the fluid ejection device (100) with a particle detector (102) depicted in FIG. 6, according to an example of the principles described herein. As can be seen in FIG. 7, in some examples, the ISFET (303) surrounds the ejector (110). Also as depicted in FIG. 7, in some examples, the electrode (305) surrounds the ISFET (303) on both an inside and an outside.

Figure 8:
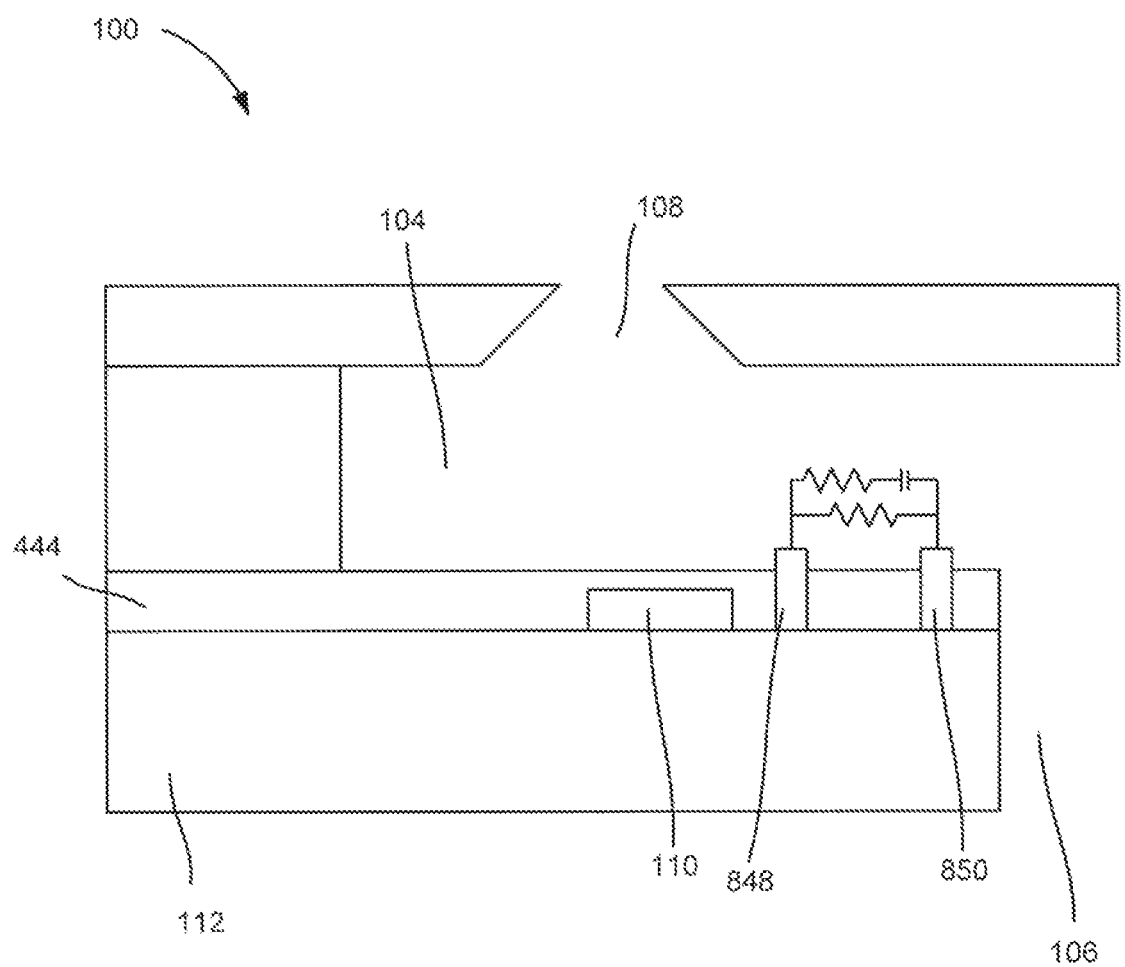
FIG. 8 is a cross-sectional diagram of a fluid ejection device with an electrical impedance spectrum particle detector, according to an example of the principles described herein.

FIG. 8 is a cross-sectional diagram of a fluid ejection device (100) with an electrical impedance spectrum particle detector (FIG. 1, 102), according to an example of the principles described herein. As described above, the particle detector (FIG. 1, 102) may take many forms. One such example is an electrical impedance spectrum particle detector that includes a pair of electrodes (848, 850) that are in fluid communication with the solution in the firing chamber (106). The impedance spectrum particle detector also includes a resistor in parallel with a resistor-capacitor pair. In this example, as described above, the electrodes (848, 850) detect an electrical impedance profile of the solution (FIG. 4, 446), which is compared to an electrical impedance profile of the fluid. A threshold difference between the electrical impedance profile of the solution (FIG. 4, 446) in the firing chamber (104) and the electrical impedance profile of the fluid indicates the presence of foreign particles in the fluid.

In one example, using such a particle detector in the fluid ejection device 1) provides on-chip particle detection capabilities; 2) allows for more advanced detection of particles; 3) provides a low cost solution as compared to off-ship detection; and 4) can be implemented in inkjet printing as well as additive manufacturing operations. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:
1. A fluid ejection device comprising:
a number of nozzles to eject fluid, each nozzle comprising:
   a firing chamber to hold fluid;
   a nozzle orifice through which to dispense fluid;
   an ejector disposed in the firing chamber to eject fluid through the nozzle orifice; and
   a particle detector to detect the presence of intermixed foreign particles within the fluid in the firing chamber.

2. The fluid ejection device of claim 1, wherein the particle detector is disposed in a location selected from the group consisting of the firing chamber and a fluid slot.

3. The fluid ejection device of claim 1, wherein the particle detector detects the presence of intermixed foreign particles within the fluid by determining a variation in amount of fluid within the fluid ejection device.

4. The fluid ejection device of claim 1, wherein the particle detector comprises an ion-sensitive field-effect transistor capacitively coupled to an electrode through the fluid.

5. The fluid ejection device of claim 4, wherein:
the ion-sensitive field-effect transistor and ejector are disposed on a same surface of the firing chamber; and
the ion-sensitive field-effect transistor surrounds the ejector.

6. The fluid ejection device of claim 4, wherein:
the ion-sensitive field-effect transistor and electrode are disposed on a same surface of the firing chamber; and
the electrode surrounds the ion-sensitive field-effect transistor.

7. The fluid ejection device of claim 4, wherein the ion-sensitive field-effect transistor comprises:
a source;
a drain; and
a floating gate capacitively coupled to the electrode through the fluid.

8. The fluid ejection device of claim 1, wherein:
the particle detector comprises a pair of electrodes to determine an electrical impedance spectrum profile of a solution disposed within the firing chamber; and
the solution comprises an amount of fluid and the intermixed foreign particles.

9. An additive manufacturing apparatus comprising:
a build material distributor to successively deposit layers of build material into a build area;
at least one agent distributor including at least one fluid ejection device to distribute agent onto the layers of build material; and
a particle detector disposed of the fluid ejection device to detect the presence of build material particles.

10. The system of claim 9, wherein the particle detector is a capacitive particle detector.

11. The system of claim 9, wherein the particle detector is an impedance particle detector.

12. A method for a fluid ejection device, comprising:
determining a concentration of ions in a solution within a firing chamber of the fluid ejection device, the solution comprising fluid and foreign particles;
determining whether the concentration of ions within the solution is outside a range of expected concentration of ions for the fluid; and
based on the concentration of ions within the solution, determining the presence of foreign particles in the fluid.

13. The method of claim 12, wherein:
determining a concentration of ions in the solution comprises measuring a drain-to-source current for the solution in the firing chamber for a given applied drain-to-source voltage; and
a change in the drain-to-source current for the solution indicates a change in concentration of ions of the solution.

14. The method of claim 12, wherein determining a concentration of ions within the solution comprises determining the presence of a drive bubble within the firing chamber.

15. The method of claim 12, further comprising executing a remedial measure to account for the presence of foreign particles within the fluid.

* * * * *